United States Patent Office 3,444,280
Patented May 13, 1969

3,444,280
METHOD OF APPLYING FOAM INSULATION TO A REFRIGERATOR CABINET
John W. Pulaski, Columbus, Ohio, assignor to Westinghouse Electric Corporation, Pittsburgh, Pa., a corporation of Pennsylvania
Filed Nov. 21, 1966, Ser. No. 595,978
Int. Cl. B32b 1/06; B29d 27/02
U.S. Cl. 264—45          4 Claims This invention relates to improvements in the application of foamed-in-place insulation to refrigerator cabinets.

It is common practice to insulate the hollow wall space of refrigerator cabinets with foamed-in-place polyurethane resins. The general structure of the cabinet typically includes an inner liner nested within a finished outer shell with thermal breaker strips closing the gap between the front edges of the liner and shell. The foamable resin mix is introduced through holes in the rear wall of the outer shell to the hollow wall space. As the material foams it flows out and fills the hollow wall space under the pressure generated by the expanding foam. The resin mix is a fairly nonviscous liquid when dispensed from the mixing head and remains so for several seconds (possibly up to 10–15) before the foaming action begins. Therefore, substantial difficulties have been experienced in sealing around the breaker strips to prevent leakage of the liquid and expanding foam. While the thermal breaker strips may be omitted during foaming operation, and a barrier be provided at the front edges of the cabinet by other means, this requires the removal of the barrier means and the application of the breaker strips after foaming. Accordingly, it is considered preferably to perform the foaming operation with the breaker strips in place.

If foaming is to be carried out with the breakers in place, various means may be used for sealing adjacent the hidden surface of the breaker strips, such as mastics, flexible foam blocks and strips, pieces of glass wool, and plastic films. On the whole however, such sealing has been considered to be inadequate. A further step which may be taken is to apply a release agent to the cabinet exterior areas along the breaker strip location prior to foaming so that the leaked foam adheres less tenaciously to the cabinet during cleaning. However, the release agent may itself create an additional cleaning problem.

Improvements in the sealing ability of the breaker strips along the shell and liner edges in some designs has substantially alleviated part of the leakage problems so that the majority of leakage now occurs at the joints of the breaker strips themselves. While it is likely that improvements will be made in the sealing ability at these joints, this ability to seal must be balanced against a joint design which permits reasonably easy assembly of the breaker strips to the liner and shell. One example of a breaker strip configuration providing generally satisfactory seals along its lengthwise edges is disclosed in Kessler, U.S. patent application Ser. No. 508,223. However, even with that design troublesome leakage may still be experienced at the joints of the breaker strips themselves.

Accordingly the general object of my invention is to reduce the problems experienced with leakage of foamed-in-place insulation for refrigerator cabinets.

This object is achieved in my improved method by first applying a fast rise, quick setting, expanding insulating material to selected joint areas susceptible to leakage in the hollow wall space. The material is applied in limited quantities to permit a substantially free expansion rise of the expanding material, but sufficient in quantity to cover the selected areas. Then, after the material has set sufficiently to form a barrier, additional expanding insulating material of the usual, initially liquid character is introduced to substantially fill the remainder of said hollow wall space. This way of providing a barrier against leakage is applicable not only to sealing the joints between lengths of breaker strips, but also to sealing the joints between other members through which undesirable leakage may occur, such as any air ducts extending through the wall space.

The method according to my invention may be very conveniently carried out by injecting controlled amounts of spray foam through strategically located holes in the back wall of the outer shell of the cabinet, the holes being located so that the injected material may be directed to the joint areas most susceptible to leakage.

The invention will be further described in connection with the accompanying drawings illustrating the method by way of example, and wherein.

Figure 1:
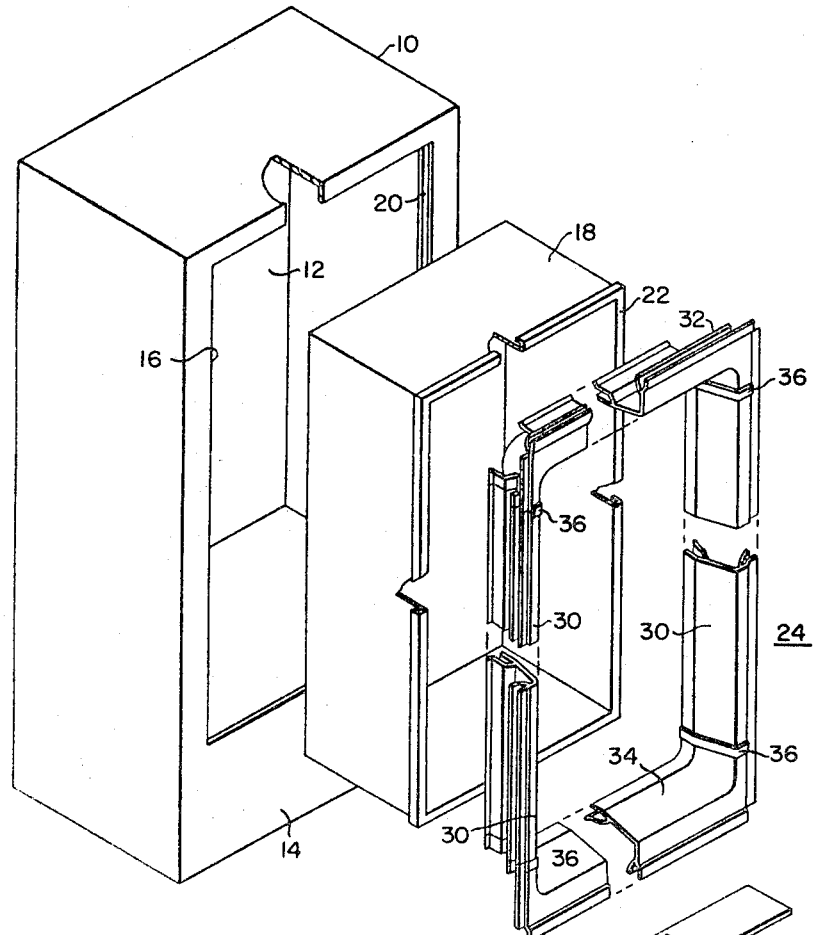
FIGURE 1 is an exploded isometric view illustrating the main part of a refrigerator cabinet with which the invention is concerned.

As shown in FIGURE 1, the refrigerator cabinet includes a box-shaped outer shell 10 having a rear wall 12 and a front face 14 provided with a large rectangular opening 16. An open-front box-shaped inner liner 18 is fitted into the shell in nested relation. The gap between the edge 20 framing the front opening 16 of the shell, and the border 22 of the liner front, is closed by the thermal breaker strip assembly generally designated 24. As described in the noted Kessler patent application, the breaker strip edges are shaped to tightly fit the shell and liner edges so that the gap between the front of the shell and liner is sealed as well as is practically possible.

In the currently preferred commercial form, the breaker strip assembly 24 comprises four separate pieces: the two opposite side pieces 30, a top piece 32, and a bottom piece 34. In their assembled form closing the gap, these pieces appear as the collar (also 24) shown in FIGURE 1. The joint areas where the top and bottom sections fit with the top and bottom ends of the opposite side sections are generally hidden by cuffs 36. These joint or cuff areas 36 are the localized areas most susceptible to leakage during an ordinary foaming operation. While tighter joints may well be developed, practical assembly considerations dictate that the joints be sufficiently loose that assembly is not inordinately difficult.

Figure 3:
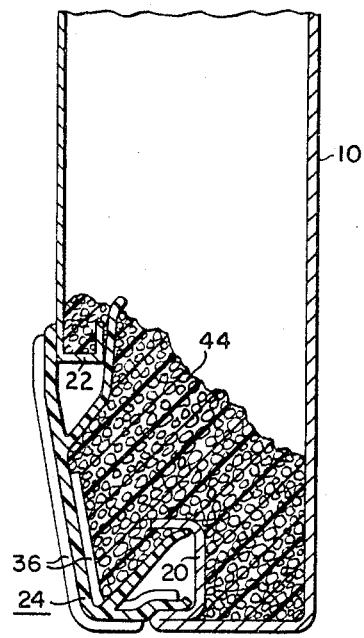
FIG. 3 is a fragmentary sectional view corresponding to one taken along the line III—III of FIG. 2, and illustrating foam coverage of a breaker strip joint area.

The parts of the cabinet shown in FIGURE 1 are assembled by nesting the inner liner within the outer shell and supporting the liner in spaced relation from the shell by suitable means. As best seen in FIG. 3, the front open face of the liner is recessed slightly behind the front face of the shell. The breaker strips are then assembled to the liner and shell and snapped in place to form the continuous collar 24. It will be understood of course that as described in connection with Simmonds U.S. patent application Ser. No. 508,221, other components are also installed in the cabinets at appropriate times. After the shell, liner and breaker strips are installed, a generally closed hollow wall space is defined between the facing walls of the liner and shell along the sides, top and bottom, and back of the cabinet.

Figure 2:
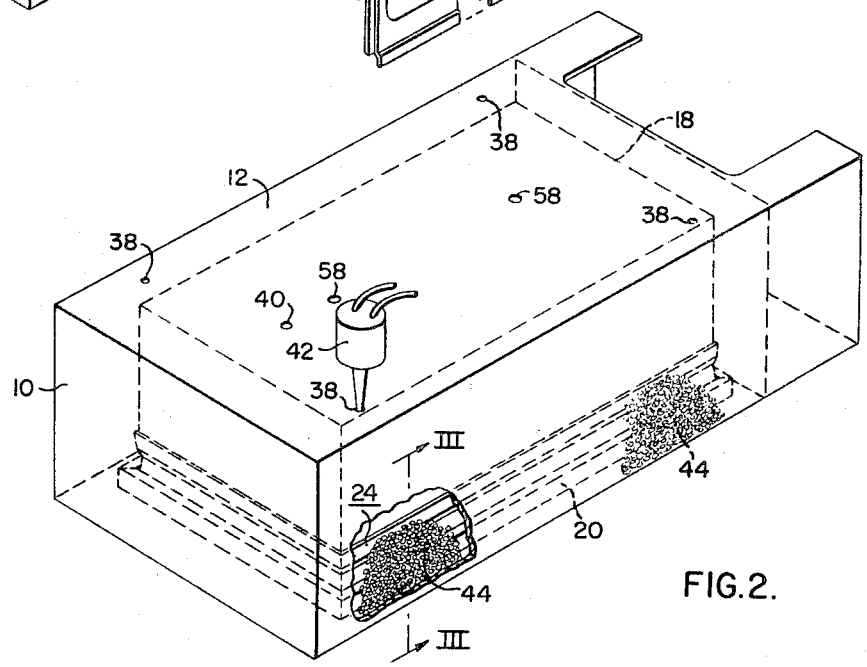
FIG. 2 is a partly broken isometric view of a refrigerator cabinet face down with the spray foam gun in a position from which the material has been injected to one selected area.

The cabinet is then preferably placed face down as shown in FIG. 2 in preparation for the step of applying the spray foam to localized areas to seal the joints most susceptible to leakage. The back 12 of the outer shell is provided with a number of strategically located small openings which, as shown in FIG. 2 for purposes of example, include two holes 38 along each side edge and one hole 40 to the central portion of the shell back 12. The spray foam is applied to the localized areas by a special gun 42. The gun may be an airless spray gun which brings streams of two component materials together in the nozzle for mixing under high pressure, the nozzle being inserted in the holes to direct the foaming mixture to the proper areas. A positive displacement, double-acting piston pump (not shown) may be used to supply the pressure. Each shot of spray foam is preferably limited to one full stroke of the piston, which is, say, 3 seconds. The timing is automatic and out of the control of the operator to insure that the quantity of spray foam is sufficient to cover but limited to that which, during expansion, does not create sufficient pressure to preclude a free rise of the material.

The placement of the injection holes 38 in the shell back is determined in accordance with the location of the joint areas 36 of the breaker strip. An outer shell of a given size may be used for various models of refrigerators and freezers. Some models may have a single compartment inner liner while others may have a dual compartment inner liner. Since the number and location of breaker strip joints depends upon the model, the back sheet 12 of the shell may be provided with sufficient holes to accommodate any model. With a single compartment inner liner, the spray foam may be injected through only the four corner holes. With other liner compartment arrangements, six or all eight holes may be necessary for access to inject the foam to the localized areas.

It has been found preferable that the gun nozzle be inserted, and the gun then be rocked as the foam is being injected to insure adequate coverage of the potential leakage area. The buildup thus obtained of the spray foam in a joint area and the localized coverage obtained is generally illustrated in FIGS. 2 and 3 in which the foam is identified by the numeral 44. While the gun 42 is aimed and rocked to provide coverage of the immediate joint area only, the borders of the coverage may lap additional areas not subject to serious leakage. However, unnecessary coverage is not particularly disadvantageous since it simply reduces the amount of foam which is subsequently introduced during the step of completely filling the hollow wall space.

Figure 5:
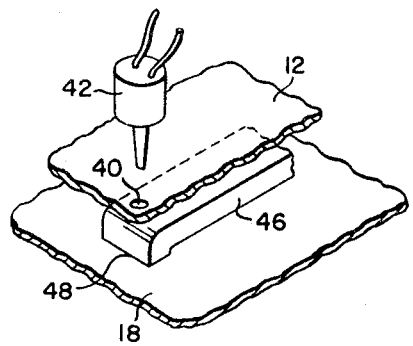
FIG. 5 is a fragmentary isometric view illustrating how the method of the invention may also be applied to seal air duct joints.

In some refrigerator and freezer models, such as the frost-free type, air duct means 46 (FIG. 5) extend through the hollow wall space into which the foam insulation is introduced. Potential leakage areas such as joints, or where the duct extends through the liner as at 48 may be blocked in accordance with the invention in the same manner as the breaker strip joint areas. This simply requires the provision of additional strategically located holes 40 for applying the spray foam. Alternatively the entire duct 46 area may be sprayed prior to the assembly of the liner into the outer shell.

After the spray foam has been applied to the localized areas, the refrigerator cabinet is encased in a supporting fixture 52 (FIG. 4) for the step of filling the remainder of the hollow wall space between the liner and shell with the usual foam insulation. The spray foam sets up sufficiently to form a barrier very quickly so that the normal period of handling in preparing the cabinet for the next foam application is more than adequate setting time. The fixture has the general shape of a rectangular box 54 and is provided with a lid 56 which abuts the rear wall 12 of the cabinet. A measured amount of the ordinary foaming material, which issues in a watery form from the nozzles 60, flows through the pour holes 58 and passes into the space between the cabinet and liner walls. The material flows about, foams and expands so that it works itself into substantially all of the space between the walls and up against the rear faces of the breaker strips, save for the areas which have already received the localized aplication of spray foam. As explained in the noted Simmonds patent application, the liner walls and breaker strips resist displacement from the pressure exerted by the expanding foam by virtue of being backed up by interior plugs and the fixture walls. The fixture and contained refrigerator are then passed through an oven for sufficient time to permit the foam of the second step to cure. Thereafter the refrigerator is removed from the fixture and the final parts assemblies made.

The foam material for the localized application should be of a fast rise nature which minimizes the tendency for the foam to penetrate small cracks and holes. Such a foam is sometimes called a spray foam and is of the type which is foaming and expanding upon discharge from the gun. As such it is different from that type of foam material which is used in the second step, and which is more akin to a liquid than a foam as it issues from the nozzle. The high pressure discharge and the foaming action of the spray foam as it issues from the gun permits the foam to be blown or "plastered" against a surface without the need of any confining molds. The use of a limited amount of this spray foam results in the expansion being in the nature of a free rise system which precludes any significant pressure buildup and accordingly reduces leakage. The currently preferred spray foam material for the localized application is a 1:1 ratio of a polyether resin and a crude polyisocyanate resin. The polyether resin may be that identified as Selectrofoam 6580 available from Pittsburgh Plate Glass Co., and the polyisocyanate resin may be either Mondur MR, available from the Mobay Chemical Company, or PPG Selectrofoam 6409. The application of approximately 70 grams of the spray foam material, which in the free rise expansion results in approximately 1 board foot of the expanded material, is introduced in each single shot of one stroke of the piston. The material to be applied by the gun is kept in pressurized tanks at pressures of, say, 90 to 100 p.s.i. for the resin, and 40 to 60 p.s.i. for the activator or polyisocyanate resin. In the passage of the material to the gun, it passes through a heat exchanger controlled at about 130° F. and then through a heated hose to the gun for ejection from the gun at a pressure of, say, 300 to 500 p.s.i. as a spray foam.

The liquid type foam material (for filling the hollow wall space fater the localized spray foam application) may comprise a polyether resin such as PPG Selectrofoam 6528B and a polyisocyanate resin "Nacconnate" 4040 available from National Aniline Co., in a ratio of 1:1.

Figure 4:
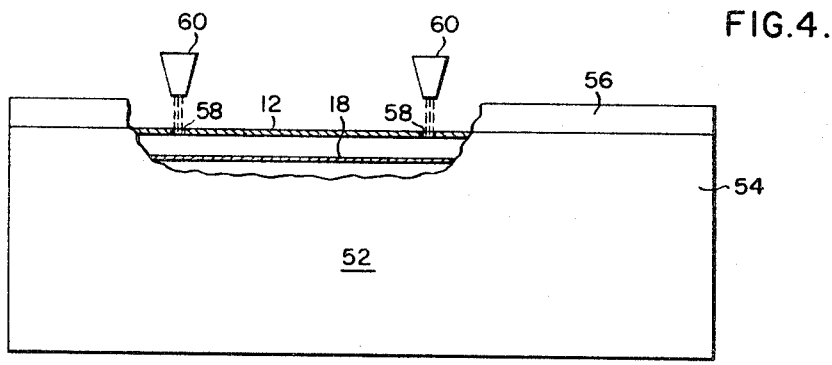
FIG. 4 is a partly-broken side view of a refrigerator cabinet in a supporting fixture during the step of applying the expanding insulating material to fill the hollow wall space.

It is to be understood that the amount of liquid foam issuing material applied in the step illustrated in FIG. 4 is controlled in accordance with the amount of spray foam material which has been previously applied to the localized areas, and in accordance with the total volume of hollow wall space to be filled. Thus the proper pressure is generated to achieve complete filling of the space without wasting material or exerting undue force upon the walls and fixture.

I claim as my invention:

1. In the method of applying foamed-in-place insulating material to the hollow wall space in a refrigerator cabinet, the improvement comprising:

first applying expanding insulating material to selected joint areas susceptible to leakage in said hollow wall space in quantities limited to that which permits a substantially free expansion rise of said material; and then after said limited quantities have set sufficiently to form a barrier at said leakage areas, applying a sufficient quantity of additional expanding insulating material to substantially fill the remainder of said hollow wall space during expansion.

2. In the method of claim 1 wherein:

said first application is of a fast rise spray foam insulating material; and said second application is of a relatively slower setting insulating material applied in liquid form.

3. The method of making a refrigerator cabinet of the foamed-in-place insulated wall type, comprising:

assembling an outer shell, a nested inner liner, and jointed breaker strip means closing the gap between the front edges of said shell and liner;

applying, through selected location holes in the rear wall of said shell, limited amounts of spray foam insulating material directed to cover the hidden side of the breaker strip joints, and then placing said cabinet in a supporting fixture and introducing sufficient additional expanding insulating material to substantially fill the remaining hollow wall space of the cabinet during expansion.

4. The method of claim 3 wherein:

said spray foam is directed toward said joints under substantial pressure to effectively blow said foam against said joints.

References Cited

UNITED STATES PATENTS 3,221,085 11/1965 Rill et al. _____ 264—45
3,373,478 3/1968 Simmonds _____ 264—45

JULIUS FROME, *Primary Examiner.*

L. M. GARRETT, *Assistant Examiner.*

U.S. Cl. X.R.

52—309; 220—9; 264—46